United States Patent [19]
Watanabe

[11] Patent Number: 5,819,123
[45] Date of Patent: Oct. 6, 1998

[54] LIGHTING DEVICE FOR CARD SIMULTANEOUS PHOTOGRAPHING CAMERA

[75] Inventor: Masana Watanabe, Tokyo, Japan

[73] Assignee: Asanuma Camera Mechanical Laboratory Co., Ltd., Tokyo, Japan

[21] Appl. No.: 864,919

[22] Filed: May 29, 1997

[30] Foreign Application Priority Data

Feb. 3, 1997 [JP] Japan .................................. 9-034423

[51] Int. Cl.$^6$ .................................................. G03B 17/24
[52] U.S. Cl. .......................................... 396/200; 396/332
[58] Field of Search .................................. 396/174, 198, 396/200, 310, 317, 322, 332

[56] References Cited

U.S. PATENT DOCUMENTS

| 1,645,590 | 10/1927 | Ernst ........................................ 396/332 |
| 3,345,924 | 10/1967 | Kitrosser ................................. 396/332 |
| 3,628,430 | 12/1971 | Morse ...................................... 396/332 |
| 4,717,930 | 1/1988 | Wheeler .................................. 396/332 |

Primary Examiner—David M. Gray
Attorney, Agent, or Firm—Oblon, Spivak, McClelland, Maier & Neustadt, P.C.

[57] ABSTRACT

A lighting device for a card simultaneous photographing camera which is easy to operate and which permits miniaturization includes a pair of lenses, with a first lens 2 for person photographing and a second lens 3 for card photographing mounted in a row on the front of the card simultaneous photographing camera 1, a semitransparent reflector plate 18 installed so that it may move back obliquely from the top edge of a nearly box-shaped casing fixed or installed through a frame change-over mechanism corresponding to both lenses, and extend up to the front of a flash window 12 of strobe flash device 10, a lens hood 21 corresponding to the lens 2 for person photographing, a card holding frame 23 for holding the card exchangeably corresponding to the lens 3 for card photographing, and a light diffusion box 25 provided between the reflection side of the semitransparent reflector plate 18 and the card holder. This lighting device serves to separate the light fluxes emitted from strobe flash device 10 into a forward transmitted light flux component and a downward reflected light flux component and apply the flux components simultaneously on the two subjects.

6 Claims, 3 Drawing Sheets

LIGHTING DEVICE FOR CARD SIMULTANEOUS PHOTOGRAPHING CAMERA

BACKGROUND OF THE INVENTION

The present invention relates to a lighting device for a card simultaneous photographing camera concerning the lighting technology of a camera for simultaneously photographing a person and an explanatory document on one piece of film to be used for the purpose of preparing identification cards illustrated with personal pictures.

In order to prepare identification cards illustrated with personal pictures, a special card simultaneous photographing camera 50 in which a first lens 51 for taking a picture of person a and a second lens 52 for taking a picture of card b containing the explanations are arranged in a row in front of film 53, as shown in FIG. 3, has conventionally been used. This camera has a function of simultaneously photographing person a and card b adjacently on one piece of film 53 and it has been used to take pictures for preparation of identification cards as shown in FIG. 4.

SUMMARY OF THE INVENTION

For the card simultaneous photographing camera 50 of this type, it is necessary to light up the two subjects, i.e. person a and card b with proper illuminance. However, because of a significant difference in distance and relative position of the two subjects from both lenses 51, 52 and in the quantity of light required for the respective subjects, a first lighting device 54 for lighting up person a and a second lighting device 55 for lighting up card b were installed as separate light sources.

The photographing device having two light sources was inconvenient for use not only because of the complexity in its structure but also because of its larger size. Moreover, since the two lighting devices are linked in action, malfunctions may occur in photography in many cases.

In view of the above-mentioned problems, the present invention was made with a view to providing a lighting device for a card simultaneous photographing camera capable of lighting up two subjects having different quantities of light and different from the camera distances with proper luminance while realizing a simplification and miniaturization of the whole camera structure.

The lighting device for a card simultaneous photographing camera of the invention includes at least one set of a pair of lenses for a frame with each set having a lens for person photographing and a lens for card photographing arranged horizontally in a row and being provided on the front of the camera body so as to permit simultaneous image formation on the film from both lenses. A strobe flash device is provided on one side of said camera body. A nearly box-shaped casing is fixed or installed through a frame change-over mechanism on the front of said camera body. A semitransparent reflector plate is movably installed so that it may move back obliquely from the top edge of the casing and extend up to the front of a flash window of said strobe flash device. The casing includes a light transmission lens hole corresponding to the person photographing lens of said camera body, a card holder for holding the card containing the explanations to be photographed on the personal picture exchangeably corresponding to the lens for card photographing, and a light diffusion box for optically communicating the reflection side of said semitransparent reflector plate to the card holder. This lighting device serves to apply a part of light flux components emitted from the strobe flash device having flashed interlocking with a shutter button of the camera body and passing through the front of said semitransparent reflector plate to the person in front of the camera by said semitransparent reflector plate and to apply a part of reflected light flux components to the card in the card holder through said light diffusion box.

Alteratively, said frame change-over mechanism can be embodied by a link mechanism having a pair of left and right parallel link arms mounted rockably on the camera body side and lighting device side respectively through pivot hinges.

DESCRIPTION OF THE PREFERRED EMBODIMENTS

Figure 1:
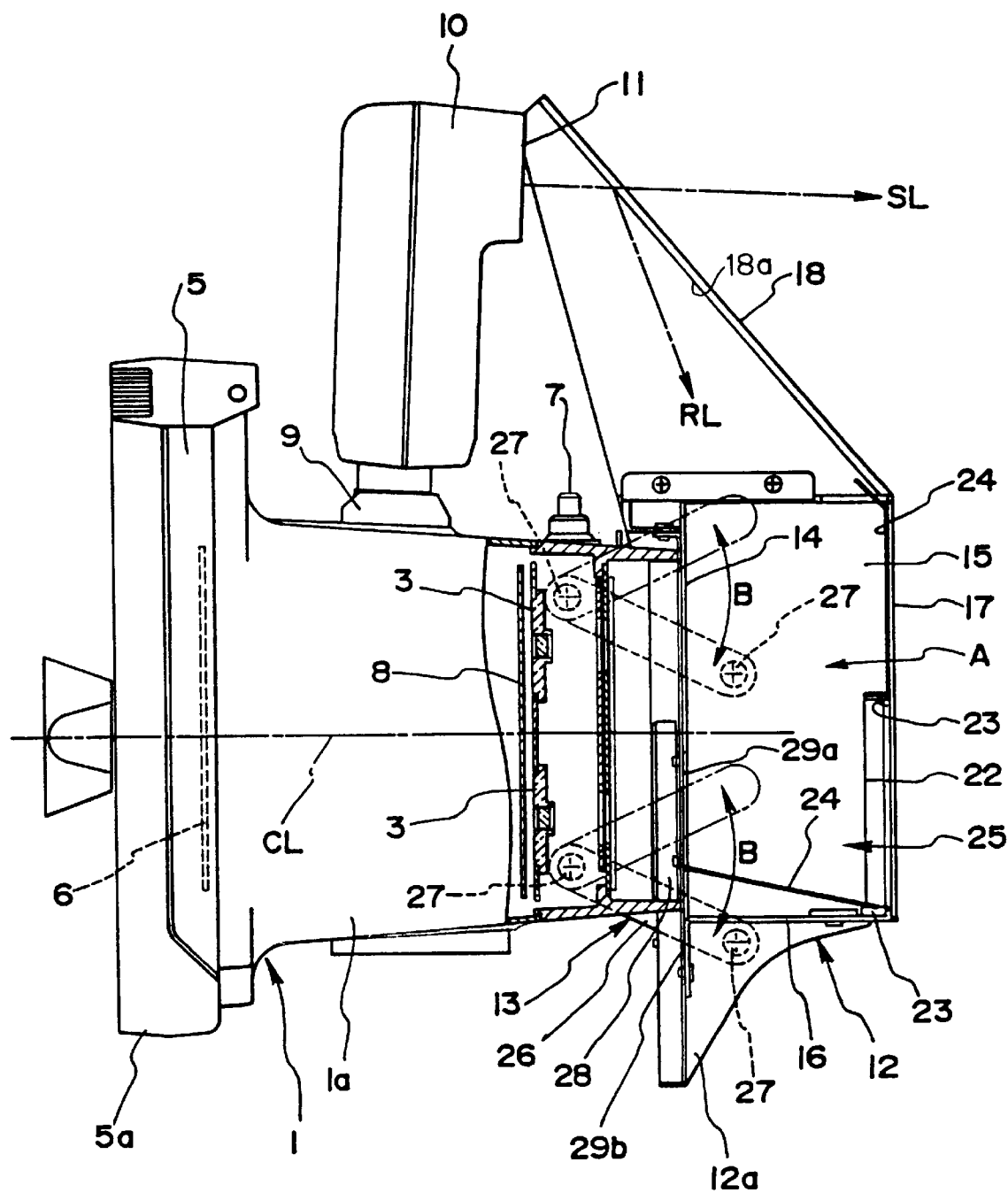
FIG. 1 is a side view of a partially cut off camera in which a lighting device is installed on the camera for two frames showing the preferred embodiment of the lighting device for card simultaneous photographing camera of the present invention.
Figure 2:
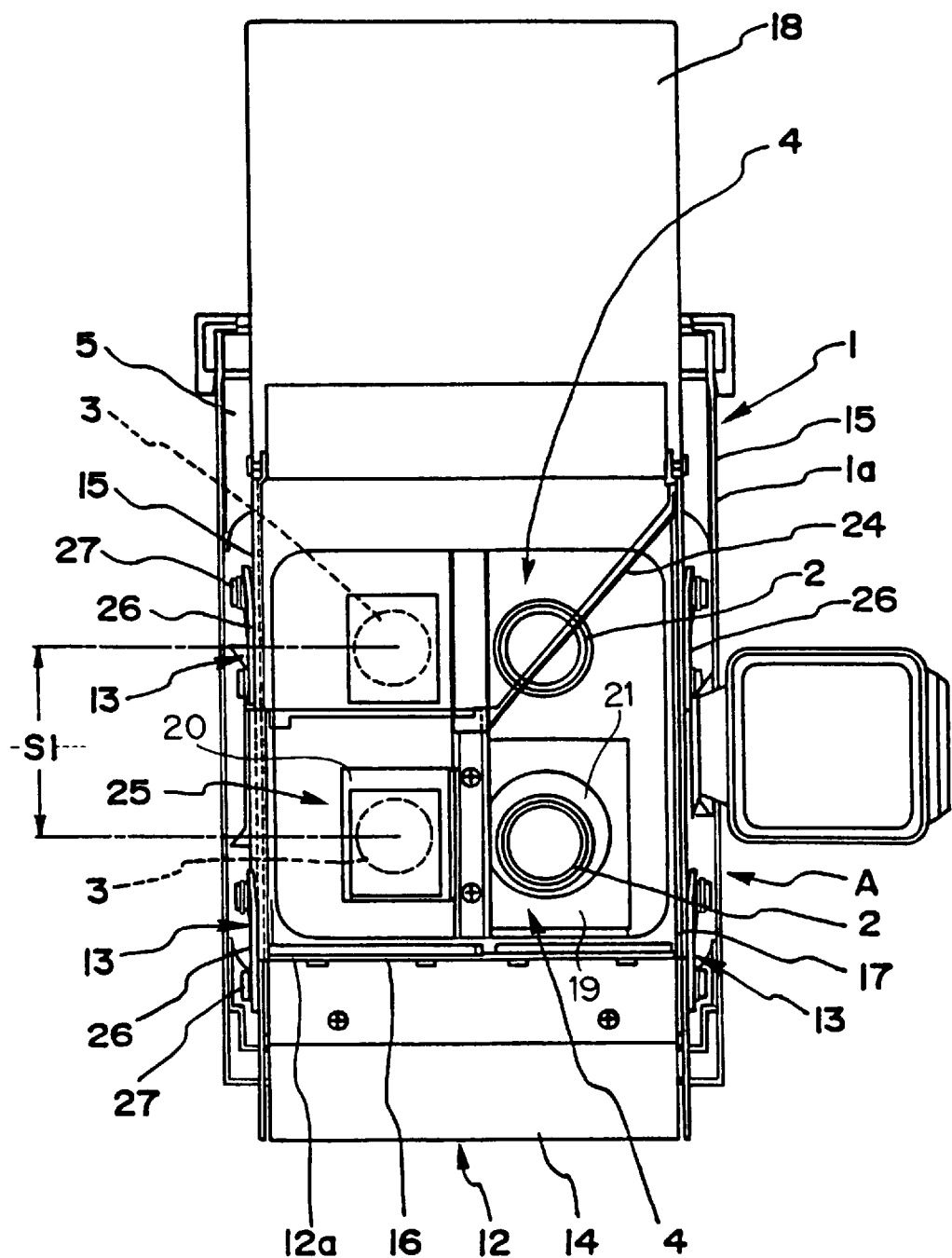
FIG. 2 is a front view of the same partially cut off camera.

In the following, the preferred embodiments of the lighting device for the card simultaneous photographing camera of the present invention will be described in accordance with FIGS. 1 and 2.

In the preferred embodiments, a lighting device is installed on the camera for two frames. FIG. 1 is a side view of a partially cut off camera, and FIG. 2 is a front view of the same partially cut off camera.

A camera body 1 for card simultaneous photographing has a black-box-like casing 1a having light shielding material. On the front side of said camera body 1, two sets of pairs of lenses are provdied for frame 4,4 each set having a lens 2 for person photographing and a lens 3 for card photographing, the sets being arranged above and below the central axis CL. In film case 5 fixed on the rear end of said camera body 1, lid member 5a, capable of freely opening and closing, is provided in the focus adjusting range of said lenses 2,2,3,3 to ensure that film 6 may be received and held orthogonally with the central axis CL.

In the rear of an optical axis of said lens sets 4,4 for both frames, a shutter device 8 is provided to be driven in interlocking manner with a shutter button 7 protruding out of casing 1a. On the upper side of said optical axis, a mount shoe 9 for strobe flash device interlocking with said shutter button 7 is provided.

A strobe flash device 10 with light a quantity adjusting function is detachably mounted on said mount shoe 9. The strobe flash device 10 emits light forwardly from a flash window 11 at the setup quantity of light and in proper shutter timing.

A lighting device 12 of the present invention has a nearly box-shaped casing 12a surrounded with light shielding materials, i.e., both sides of a base plate 14 are surrounded with side plates 15,15, a bottom side with a bottom plate 16, and a front side with a front plate 17. On said casing 12a, a semitransparent reflector plate 18 is installed between front edges of both side plates 15,15 in such manner that it may move back obliquely from the top edge of said front plate 17 and extend up to the front of the flash window 11 of said strobe flash device 10.

In the preferred embodiments, said lighting device 12 is supported through a frame change-over mechanism having a of link mechanism 13. The lighting device 12 is positioned on the front of camera body 1, and is installed and held as to be freely displaceable in a vertical direction within the range of a distance S1 between optical axes of upper and lower pairs of lens sets 4,4 for frames. The semitransparent reflector plate 18 is positioned in front of the flash window 11 of said strobe flash device 10.

In base plate 14 of said casing 12a, light transmission lens holes 19,20 are provided at lower half positions to correspond respectively to lens 2 for person photographing and lens 3 for card photographing for one set of a pair of lenses for frame 4 on the lower side of camera body 1. The light transmission lens hole 19 on the side of lens 2 for person photographing has a lens hood 21 extending continuously to the front plate 17.

Figure 3:
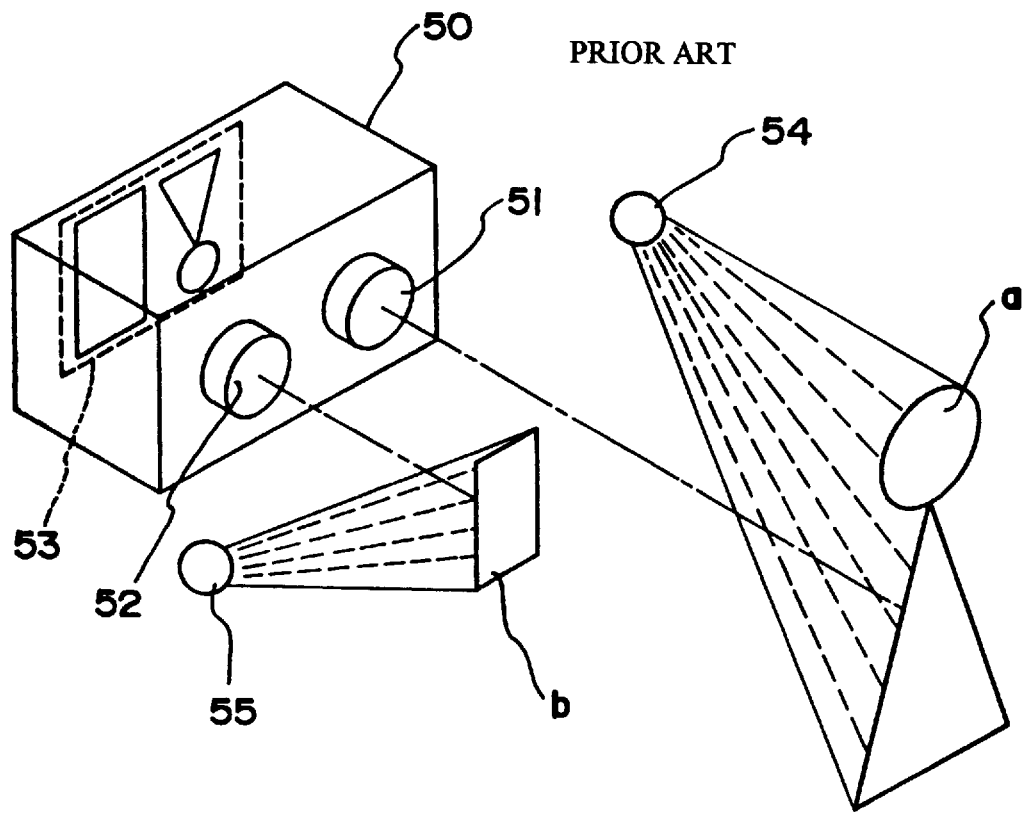
FIG. 3 is an explanatory schematic drawing showing the structure of the conventional type card simultaneous photographing camera and its lighting device.
Figure 4:
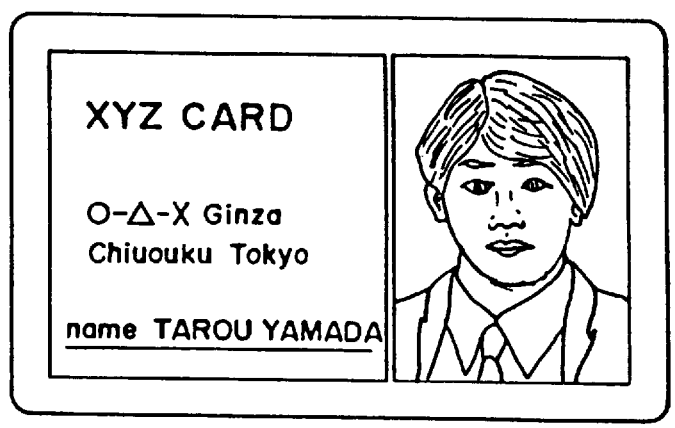
FIG. 4 is a front view of a picture for preparation of an identification card.

Moreover, at the position of front plate 17 corresponding to the light transmission lens hole 20, a card holding frame 23 extending continuously to a card insertion slit 22 made in the side plate 15 of the casing 12a is provided to ensure that card b containing explanations to be photographed on a personal picture (refer to FIG. 3) may be inserted from the card insertion slit 22.

Said semitransparent reflector plate 18 is fixed at a sweepback angle of 35° to 55° to provide an irregular reflection surface 18a. In said casing 12a, a light difusion box 25 has a diffusing partition plate 24 arranged to ensure that light fluxes emitted from strobe flash device 10 and reflected by said semitransparent reflector plate 18 are directed to the card holding frame 23.

In said link mechanism 13, four link arms 26 are mounted by pivot hinges 27 on the casing 1a side of the camera body 1 and on the casing 12a side of the lighting device 12, respectively so that they may move rockably between the upper and lower frames (arrow B) to select the upper or lower frame.

A permanent magnet 28 for magnetic fixing is fixed on the front side of casing 1a of said camera body 1. On the base plate 14 of the lighting device 12, magnetic plates 29a, 29b corresponding to said permanent magnet 28 for magnetic fixing are magnetically fixed at the displaced position of said link mechanism 13 when said link mechanism 13 is moved to select the upper or lower frame.

The lighting device for card simultaneous photographing camera of said configuration is used when link mechanism 13 is operated rockably to select the upper or lower frame and magnet plate 29a or 29b is fixed magnetically onto permanent magnet 28 for magnetic fixing. When the shutter button 7 is pressed and a card corresponding to the person to be photographed is inserted from the card insertion slit 22 and held by the card holding frame 23 of the light diffusion box 25, the shutter device 8 and strobe flash device 10 are activated.

The semitransparent reflector plate 18 of the lighting device 12 separates the light fluxes emitted from the flash window 11 of strobe flash device 10 into forward transmitted light flux component SL and downward reflected light flux component RL. Forward transmitted light flux component SL is applied on the person in front of the camera to form its image on film 6 by lens 2 for person photographing. On the other side, downward reflected light flux component RL is applied on the card inserted in the card holding frame 23 via the light diffusion box 25 in the casing 12a of the lighting device 12 to form an image of of the card on film 6 by lens 3 for card photographing.

The total quantity of light to be applied on the person and card can be adjusted by the light quantity adjusting function of the strobe flash device 10, and the ratio of quantity of light to be applied on the person to that on the card can be optimized through the properly designed reflection factor and angle of sweepback of the semitransparent reflector plate 18.

For the preferred embodiments as mentioned above, the lighting device 12 to be used in a camera for two frames has been described. For a camera having one pair of lens 2 for person photographing and lens 3 for card photographing, however, the lighting device 12 with the frame change-over mechanism A omitted is fixed on the front of the camera body 1.

In the preferred embodiments of the invention described above, the frame change-over mechanism A for the lighting device 12 to be used in a camera having two frames and the link mechanism 13 is shown. However, since the structure makes the lighting device 12 movable corresponding to the lens position of each frame, it is also possible, for example to install a guide rail longitudinally on the front of the camera body 1 and to mount the lighting device 12 slidably on said guide rail so as to be movable at a predetermined stroke.

As mentioned above, the lighting device for card simultaneous photographing camera of the present invention is structured so that light fluxes emitted from a light source (strobe flash device) and separated by the semitransparent reflector plate may be applied on the two subjects, i.e., a person and a card in good timing and quantity of light. It is possible therefore to use a single light source, for simplification and miniaturization of the photographing device as a whole.

Moreover, since a single light source may save the trouble of making timing adjustment of interlocking actions, malfunction in photography may be also eliminated. Because of these excellent features, the present invention is beneficial.

What is claimed is:

1. An identification imaging system comprising:
 a camera having a front side including
   at least one pair of lenses provided on said front side of said camera, wherein each pair of said at least one pair of lenses includes a first lens for
   photographing a first subject located separate from said camera and a second lens for photographing a second subject,
 a single light source for emitting source light flux components;
 a light diffusion system provided on said front side of said camera anterior to said at least one pair of lenses,
 said light diffusion system including
   a semitransparent reflector plate;
   a holder for retaining said second subject; and
   a light diffusion box for optically communicating said semitransparent reflector plate to said holder, wherein
   a first portion of said source light flux components is applied through said semitransparent reflector plate to said first subject, and
   a second portion of said source light flux components is reflected by said semitransparent reflector plate and applied through said light diffusion box to said holder.

2. An identification imaging system according to claim 1 wherein:

said camera includes a casing having a top edge, said single light source has a top edge and is provided on a first side of said camera, and said semitransparent reflector plate is movably mounted on said top edge of said casing to extend to said top edge of said single light source to cover said single light source for varying a ratio of simultaneous source light flux components directed toward said first subject and source light flux components directed toward said second subject from said single light source by said semitransparent reflector plate.

3. An identification imaging system according to claim 1 wherein:

said camera includes a casing having a top edge, said semitransparent reflector plate is movably mounted on said top edge of said casing to extend up to said top edge of said single light source to cover said single light source for varying a ratio of simultaneous source light flux components directed toward said first subject in a first intensity and source light flux components directed toward said second subject in a second intensity from said single light source by said semitransparent reflector plate.

4. An identification imaging system according to claim 1 wherein:

said camera includes a casing having a top edge, said identification imaging system further comprises a frame change-over mechanism provided on said front side of said camera, wherein said at least one pair of lenses includes at least two pairs of lenses, whereby each of said at least two pairs of lenses is arranged horizontally on a frame provided on said front side of said camera, said casing is mounted through said frame change-over mechanism, and said frame change-over mechanism is movably mounted on said camera to move said casing to expose no more than one pair of said at least two pairs of lenses to said first subject and said second subject simultaneously.

5. An identification imaging system according to claim 4 wherein:

said frame change-over mechanism includes a link mechanism having a pair of link arms rockably mounted in parallel on said camera.

6. An identification imaging system comprising:

camera means having a front side including at least one pair of lenses provided on said front side of said camera, wherein each pair of said at least one pair of lenses includes a first lens for photographing a first subject located separate from said camera and a second lens for photographing a second subject;

single light source means for emitting source light flux components from a single light source;

light diffusion means provided on said front side of said camera anterior to said at least one pair of lenses, said light diffusion means including semitransparent reflector means;

holding means for retaining said second subject; and means for optically communicating said semitransparent reflector means to said holding means.

* * * * *